(12) United States Patent
Panzarella

(10) Patent No.: US 8,190,345 B1
(45) Date of Patent: May 29, 2012

(54) VEHICLE SAFETY SYSTEM

(76) Inventor: Robert Panzarella, South Plainfield, NJ (US)

( * ) Notice: Subject to any disclaimer, the term of this patent is extended or adjusted under 35 U.S.C. 154(b) by 0 days.

(21) Appl. No.: 13/220,416

(22) Filed: Aug. 29, 2011

(51) Int. Cl.
*G06F 7/70* (2006.01)

(52) U.S. Cl. ............ 701/70; 701/301; 701/468; 701/45; 701/96

(58) Field of Classification Search ............ 701/41, 701/42, 45, 70, 78, 93, 96, 98, 408, 468, 701/300, 301, 302
See application file for complete search history.

(56) References Cited

U.S. PATENT DOCUMENTS

| | | | |
|---|---|---|---|
| 2008/0111673 A1* | 5/2008 | Roberts | 340/479 |
| 2010/0106356 A1* | 4/2010 | Trepagnier et al. | 701/25 |

* cited by examiner

Primary Examiner — Richard M Camby

(57) ABSTRACT

A vehicle safety system installed within a vehicle operable to monitor the perimeter of vehicle and provide notification of objects within a defined range so as to alert the driver of the vehicle of a probable collision. The vehicle safety system includes a plurality of transceivers that are circumferentially mounted around the vehicle that function to provide detection of another object. A brake actuator is further included wherein the brake actuator is operable to engage the braking system of the vehicle upon the condition of the vehicle approaching an object within its perimeter and it has been calculated by the controller of the vehicle safety system that a collision with the object is probable. A warning light is further included to provide visual notification to a second vehicle that is generally rearward of the vehicle wherein the warning light is illuminated in a flashing sequence so as to provide visual notification of the second vehicle being too proximate the vehicle. A monitor is further included and disposed within the passenger compartment of the vehicle to provide directional notification of the location of an object within the perimeter of the vehicle.

13 Claims, 2 Drawing Sheets

VEHICLE SAFETY SYSTEM

FIELD OF THE INVENTION

The present invention relates to a vehicle safety system, more specifically but not by way of limitation, a vehicle safety system that monitors the distance intermediate the vehicle in which the safety system is installed and all proximate vehicles and/or objects wherein the system provides visual and audio notification of objects and/or other vehicles that may be in a position to create a potentially dangerous situation.

BACKGROUND

Millions of individual utilize vehicles such as but not limited to passenger automobiles as part of their daily routine. Whether driving to work or to another destination, daily utilization of a vehicle is common. With the plurality of vehicle on the roads, thousands of accidents occur everyday and hundred of lives are lost each week in automobile accidents. While safety device such as but not limited to seat belts and air bags routinely save lives, these safety features are unable to prevent automobile accidents.

Distracted driving is one of the main causes of automobile accidents. Whether the driver is adjusting the radio or air conditioning system, talking on a cellular phone or engaged in a conversation with another individual within the automobile, drivers of automobiles have a plurality of sources of distractions, which lead to numerous accidents. One of the leading causes of accidents are drivers that follow to close behind another automobile while traveling in the same direction along a road. The lack of proper distance between the two vehicles results in the driver being unable to have the proper time or distance to react to avoid a collision with the vehicle to which they are following too close. Distracted driving often results in drivers following too close and results in the inability for the driver to react in time to a situation and results in an accident that can often be fatal.

One problem with current safety systems is that they fail to measure the distance between two vehicles and provide notification as to whether or not the driver operating a vehicle that is following another vehicle is following at a proper distance so as to provide sufficient time and distance for the driver to significantly increase the probability of avoiding a collision. Additionally, the vehicle that is being followed too close does not have the ability to provide a signal to a vehicle behind it alerting the driver of the vehicle that they are following to closely and should alter their position in order to avoid a potential collision.

Accordingly there is a need for a vehicle safety system that monitors the distance between vehicles and provide notification to the drivers of the vehicles as to whether or not their vehicles are properly positioned so as to substantially increase the probability of colliding with each other.

SUMMARY OF THE INVENTION

It is the object of the present invention to provide a safety system mounted within at least one vehicle that monitors the distance between the vehicle and other vehicles traveling proximate thereto wherein the system alerts the driver of the vehicle as to whether or not their vehicle is properly spaced relative to the other vehicles on the road so as to substantially increase the probability of avoiding a collision with the vehicles proximate to the vehicle equipped with the safety system.

Another object of the present invention is to provide a safety system for a vehicle that measures the distance between a first vehicle and a second vehicle wherein the first vehicle having the safety system installed therein provide visual and audio notification to the driver information to substantially increase the probability of colliding with another object or vehicle.

Yet a further object of the present invention is to provide a safety system installed in a first vehicle that is capable of detecting the presence of either an object or a second vehicle within a defined perimeter of the first vehicle and provide visual and/or audio notification thereof to the driver of the first vehicle.

Still another object of the present invention is to provide a safety system installed in a first vehicle that measures the distance between the first vehicle and a second vehicle wherein the system provides a visual signal to the driver of the second vehicle that the second vehicle is too close to the first vehicle.

An additional object of the present invention is to provide a safety system installed within a vehicle that detects objects or a second vehicle within a defined perimeter of the vehicle that is operably coupled to the braking system of the vehicle.

Yet another object of the present invention is to provide a safety system installed within a vehicle that includes a database having a roadmap the has stored therein the locations of intersections having traffic signs such as but not limited to stop signs or traffic signal wherein the safety system is operable to provide notification to the driver upon being proximate the intersection.

A further object of the present invention is to provide a safety system installed within a vehicle that includes a light that flashes in a particular sequence so as to notify a driver of a second vehicle behind and following the vehicle with the safety system installed therein that the second vehicle is too close.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
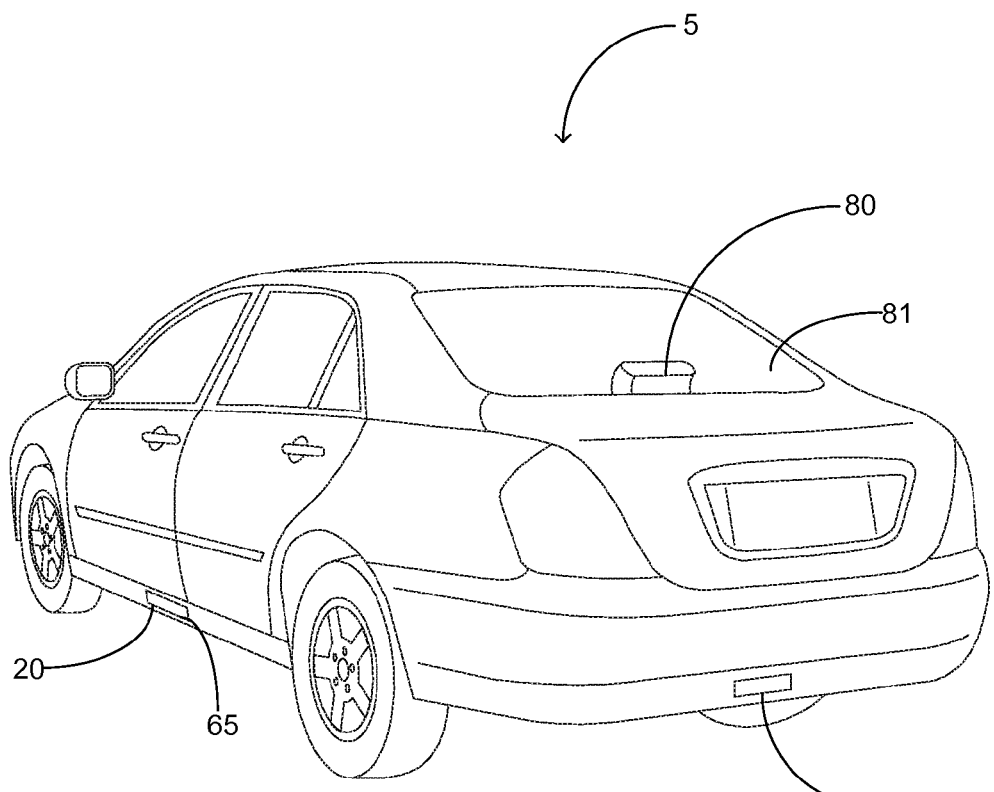
FIG. 1 is a rear perspective view of a vehicle having the safety system of the present invention particularly illustrating the perimeter sensors.
Figure 2:
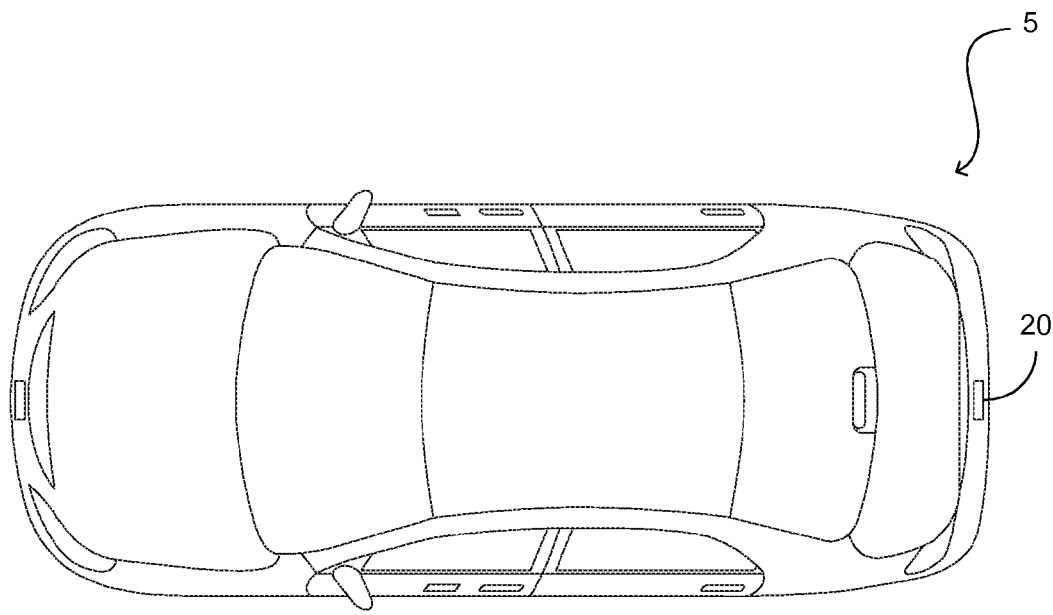
FIG. 2 is a top perspective view of a vehicle having the safety system of the present invention illustrating the perimeter sensors.
Figure 3:
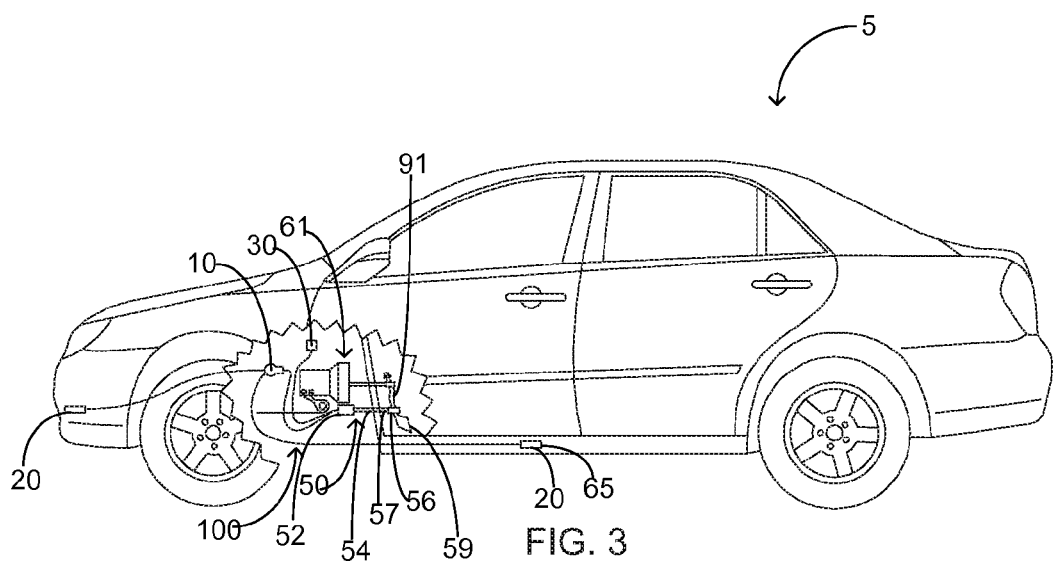
FIG. 3 is a side view of an exemplary vehicle having the safety system of the present invention illustrating a diagrammatic view of the components thereof.
Figure 4:
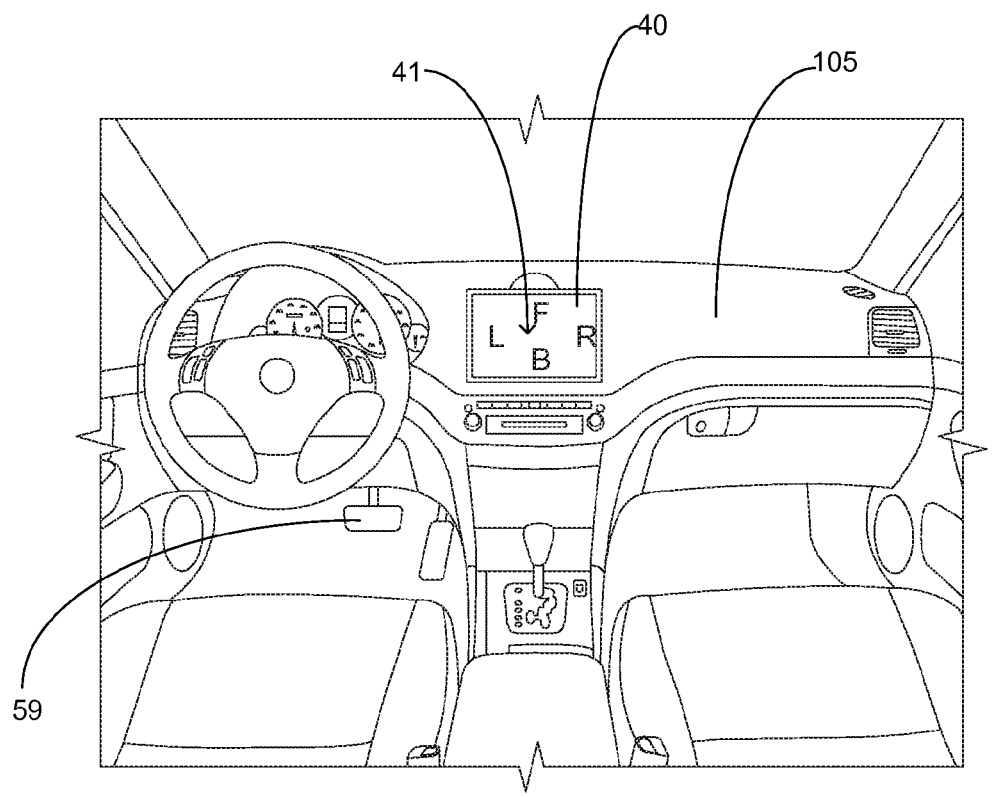
FIG. 4 is an internal view of an exemplary vehicle having the safety system of the present invention installed therein.

Referring now to the drawings submitted herewith, wherein various elements depicted therein are not necessarily drawn to scale and wherein through the views and figures like elements are referenced with identical reference numerals, there is illustrated vehicle safety system 100 constructed according to the principles of the present invention.

The vehicle safety system 100 includes a controller 10 mounted within the vehicle 5, which functions to control the operational tasks of the vehicle safety system 100. The controller 10 includes the necessary electronics to receive, store, manipulate and transmit data signals required for various operations of the vehicle safety system 100. The controller 10 is electrically coupled with the vehicle's twelve-volt power system and is configured to provide power to the components of vehicle safety system 100.

Operably coupled to the controller 10 are a plurality of transceivers 20. The transceivers 20 function to monitor the perimeter of the vehicle 5 for objects such as but not limited to other vehicles or obstacles. The transceivers 20 continuously monitor the perimeter of the vehicle 5 and transmit data back to the controller 10 wherein the controller 10 executes algorithms that constantly monitor the position of objects within the perimeter of the vehicle 5 and the distance intermediate the vehicle 5 and the detected objects. While no particular perimeter distance is required, good results have been achieved utilizing transceivers 20 that are programmed to provide monitoring capabilities for approximately a half-mile from either the front or rear of the vehicle and approximately thirty yards for either the left and right side of the vehicle. The transceivers 20 utilize laser light and transmit the laser light to provide monitoring of objects within the defined perimeter of the vehicle 5. As is known in the art, laser light sensors utilize laser light and project the laser light and subsequent contact with an object, a portion of the light is reflect back to the transmission source. The transceivers 20 transmit the laser light and further function to receive any reflected light from the transmission. The transceivers 20 are operated by the controller 10 wherein the controller 10 functions to execute the continuous transmission of the laser light and record the time for any reflection that may occur. The controller 10 converts the time into a distance and monitors the distance between the vehicle 5 and the detected objected. While good results have been achieved utilizing laser light for the transceivers 20, it is contemplated within the scope of the present invention that the transceivers 20 could utilize radar and/or sonar to monitor the perimeter of the vehicle 5.

The vehicle safety system 100 further includes a global positioning receiver 30. The global positioning receiver 30 is a conventional global positioning receiver that utilizes trilateration to calculate its position on the earth's surface. The global positioning receiver 30 is operably coupled to the controller 10 that includes a roadmap database. The controller 10 utilizes the information from the global positioning receiver 30 and the roadmap database to identify the exact location of the vehicle 5. The vehicle safety system 100 functions to alert the driver of the vehicle 5 when approaching an intersection that has either a traffic signal or some other traffic sign that would require the vehicle 5 to either yield or stop. The controller 10 continuously receives data from the global positioning receiver 30 and utilizes the positioning data and integrates the positioning data with the roadmap database. The roadmap database includes therein all location information pertaining to traffic signals and/or traffic signs. As the driver of the vehicle 5 approaches an intersection or other area of the road that the roadmap database has data identifying the area as having a traffic signal or other sign that could result in the driver of the vehicle 5 to either stop or alter their current speed, the vehicle safety system 100 provides a visual warning signal to the driver of the vehicle 5 utilizing the monitor 40. It is contemplated within the scope of the present invention that any type of visual signal could be provide to the driver utilizing the monitor 40 such as but not limited to a specific indicia or logo being illuminated in the center region 41 of the monitor 40.

The vehicle safety system 100 further includes a brake actuator 50. The brake actuator 50 further includes a piston 52, rod 54 and keeper 56. The piston 52 is a conventional hydraulically operated piston that is operably coupled to the rod 54. The rod 54 is an elongated bar constructed of s substantially rigid material such as but not limited to metal. Integrally secured to the second end 57 of the rod 54 is the keeper 56. The brake actuator 50 is operably coupled to the controller 10 and receives a signal therefrom to engage upon certain criteria being fulfilled. For example but not by way of limitation, as the vehicle 5 is traveling down a road and the transceivers 20 detect an object in the path of the vehicle 5, the controller 10 continuously calculates the distance between the vehicle 5 and the detected object. If the controller 10 calculates that the distance between the vehicle 5 and the detected object has reached a certain distance that upon continuance thereof the vehicle 5 would collide with the object the controller 10 will transmit a signal to the brake actuator 50 to begin applying the brake 59 of the vehicle 5 so as to either reduce the speed or stop the vehicle in order to substantially increase the probability of the vehicle 5 colliding with the detected object. Upon receiving a signal from the controller 10, the brake actuator 50 will activate the piston chamber 52 that will move the rod 54 towards the brake 59. The keeper 56 is operable to releasably secure to the brake pedal lever 91. While no particular method of releasably coupling is required between the keeper and the brake pedal lever 91, good results have been achieved by utilizing an electromagnet to releasably secure the keeper 56 to the brake pedal lever 91. Ensuing the keeper 56 releasably securing to the brake pedal lever 91, the piston chamber 52 begins to retract the rod 54 towards the piston chamber 52 so as to engage the brake system 61 of the vehicle 5. It is contemplated within the scope of the present invention that the vehicle safety system 100 could engage the brake system 61 of the vehicle 5 so as to increase the distance between the vehicle 5 and the detected object and maintain a proper distance therebetween or completely stop the vehicle 5 so as to substantially increase the probability of colliding with the detected object. If the controller 10 engages the brake system 61 of the vehicle 5 so as to reduce the speed of the vehicle and maintain a proper distance between the vehicle 5 and the detected object wherein the detected object is traveling in the same direction as the vehicle 5, the controller 10 utilizes a programmed algorithm and data signals from the transceivers 20 to engage the brake system 61 until the vehicle 5 is within a proper distance as defined by the programmed algorithm within the controller 10. Those skilled in the art will recognize that numerous distances could be programmed into the controller 10 as safe distances based upon the current speed of the vehicle 5.

The vehicle safety system 100 further includes lateral transceivers 65 that monitor the presence of objects that are located on either side of the vehicle 5. The lateral transceivers 65 function to detect and measure the presence of objects such as but not limited to another vehicle that are proximate either the left side or right side of the vehicle. The controller 10 is programmed to transmit a signal to the monitor 40 wherein the monitor displays a visual notification to the driver of the vehicle 5 as to the presence of an object on either the left side or right side of the vehicle 5. While no particular visual notification is required, good results have been achieved by utilizing an illuminated letter R and an illuminated letter L displayed on the monitor 40, so as to alert the driver of the vehicle 5 as to the presence of a detected object on the right side or left side respectively of the vehicle 5.

The vehicle safety system 100 further includes a warning light 80 mounted proximate the rear window 81 of the vehicle 5. The warning light 80 is operable to provide a visual signal to the driver of a second vehicle that is proximate the vehicle 5 wherein the visual signal is provided upon detection that the second vehicle proximate the vehicle 5 is too close. The warning light 80 is a conventional light that is either integrated into the brake light system of the vehicle or is mounted adjacent thereto. The warning light 80 is operably coupled to the controller 10 and the controller 10 transmits signals to the warning light 80 so as to execute the illumination thereof. It is contemplated within the scope of the present invention that the warning light 80 could illuminate in a sequence pattern based upon the calculated distance between the vehicle 5 and the second detected vehicle. More specifically but not by way of limitation, the warning light 80 could be programmed to flash three times sequentially and a fourth time for approximately five seconds to notify the driver of the second vehicle that the second vehicle is too close to the vehicle 5. It is further contemplated within the scope of the present invention that the controller 10 utilizes preprogrammed distances from sources such as but not limited to the National Institute for Highway Safety in executing the algorithm and determining what distance should be measured between the vehicle 5 and the second vehicle so as to illuminate the warning light 80. More specifically but not by way of limitation, the controller 10 is programmed to illuminate the warning light 80 to warn a second vehicle generally rear of the vehicle 5 if the second vehicle is closer to the vehicle 5 than two car lengths at twenty miles per hour, three car lengths at thirty miles per hour and four car lengths at forty miles per hour. Those skilled in the art will recognize that the speed to car length ratio could be measure to include numerous different speeds. While numerous colors could be utilized for the warning light 80, good results have been achieved utilizing an amber colored light. It is further contemplated that the warning light 80 could utilize a second color in addition to amber to provide an illumination sequence to alert vehicles proximate to and generally behind the vehicle 5. More specifically but not by way of limitation, the second color utilized could be red.

The warning light 80 is additionally activated with a particular illumination sequence when the vehicle safety system 100 is engaging the brake actuator 50 so as to alert drivers of additional vehicles proximate to the vehicle 5. While any particular illumination sequence could be utilized, good results have been achieved utilizing an illumination sequence that alternates between the first color and second color five times, then flashes the second color three times. It is additionally contemplated within the scope of the present invention that subsequent the aforementioned sequence that the controller 10 would then activate the conventional hazard warning lights of the vehicle 5.

The monitor 40 is integrally mounted within the dashboard 105 of the vehicle 5 and is a conventional LCD monitor. The monitor 40 further includes audio speakers (not illustrated herein). The vehicle safety system 100 utilizes the monitor 40 to provide visual notification and audio notification of detected objects within the monitored perimeter of the vehicle 5 so as to alert the driver of the vehicle and substantially reduce the probability of colliding with the object. Those skilled in the art will recognize that numerous types of visual and audio signals could be utilized to alert the driver of the vehicle 5.

It is further contemplated within the scope of the present invention that the vehicle safety system 100 could additionally provide a speed governing function so as to control the rate of speed of the vehicle 5. In this mode, the controller 10 would monitor data received from the global positioning receiver 30 and utilize to calculate the current speed of the vehicle 5. The controller 10 would cross-reference the current speed data with data provided in the roadmap database to ensure that the current speed does not exceed the speed limit within the roadmap database by more than ten miles per hour. If the current speed exceeds the speed limit within the roadmap database that is allowed for the current position of the vehicle 5, then the controller 10 will engage the brake actuator 50 so as to reduce the speed of the vehicle. While no particular level of brake pressure is required to be applied to the brake system 61 of the vehicle 5, it is contemplated within the scope of the present invention that the braking pressure could range from a minimal force to sufficient force to cause the vehicle 5 to completely stop. It is contemplated within the scope of the present invention that the vehicle safety system 100 could govern the speed of the vehicle utilizing only current speed data. Additionally, it is further contemplated within the scope of the present invention that the vehicle safety system 100 would include an override function so as to permit the driver to operate the vehicle at excessive speeds if required.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A safety system mounted within a vehicle that is operable to monitor the perimeter of the vehicle comprising:

a controller, said controller further including an integrated circuit board having the necessary electronics to receive, store, transmit and manipulate data, said controller operable to transition the safety system between a first mode and a second mode;

a plurality of transceivers, said plurality of transceivers operable to provide object detection substantially around the perimeter of the vehicle, said plurality of transceivers being operably coupled to said controller;

a brake actuator, said brake actuator further having a first position and a second position, said brake actuator configured to engage the braking system of the vehicle in said second position;

a warning light, said warning light being mounted proximate the rear window of the vehicle, said warning light operable coupled to said controller, said warning light having a first mode and a second mode; and a global positioning sensor, said global positioning sensor operably coupled to said controller, said global positioning sensor operable to provide latitude and longitude data to said controller, said global positioning sensor further operable to provide the current speed of the vehicle to said controller.

2. The safety system as recited in claim 1, wherein said controller transitions said warning light from said first mode to said second mode ensuing receipt of a signal from said plurality of transceivers that an object has been detected generally rearward of the vehicle.

3. The safety system as recited in claim 2, wherein in said second mode, said warning light is illuminated in a flashing sequence.

4. The safety system as recited in claim 3, and further including a monitor, said monitor disposed within the passenger compartment of the vehicle, said monitor operable to display location of detected objects within the perimeter of the vehicle.

5. The safety system as recited in claim 4, wherein said brake actuator further includes a piston chamber, said piston chamber further including a rod, said rod having a first end and a second end, said second end of said rod including a retention mechanism, said retention mechanism operable to be releasably secured to the brake pedal of the braking system of the vehicle and apply pressure thereto in said second mode of the safety system.

6. The safety system as recited in claim 5, wherein in said first mode of the safety system, said controller places said brake actuator in said first position, wherein in said first position said brake actuator is not operably engaged with the braking system of the vehicle.

7. The safety system as recited in claim 6, wherein in said second mode of the safety system, said controller places said brake actuator in said second position said controller placing said brake actuator in said second position subsequent the detection of an object by said plurality of transceivers wherein the vehicle is approaching the object and the speed of the vehicle is greater than that of the object.

8. A safety system mounted within a first vehicle having a conventional braking system that is operable to monitor the perimeter of the first vehicle wherein the safety system calculates the current speed of the first vehicle and the distance between the first vehicle and a second vehicle comprising:

a controller, said controller further including an integrated circuit board having the necessary electronics to receive, store, transmit and manipulate data, said controller operable to transition the safety system between a first mode and a second mode;

a plurality of laser transceivers, said plurality of transceivers being circumferentially mounted around the first vehicle, said plurality of laser transceivers operable to provide object detection of a second vehicle, said plurality of laser transceivers functioning to transmit a signal to said controller subsequent detection of the second vehicle, said plurality of laser transceivers operable to continuously monitor the perimeter of the first vehicle for a second vehicle, said plurality of transceivers being operably coupled to said controller;

a brake actuator, said brake actuator further having a first mode and a second mode, said brake actuator configured to engage the braking system of the first vehicle in said second mode;

a warning light, said warning light being mounted proximate the rear window of the first vehicle, said warning light operable coupled to said controller, said warning light having a first mode and a second mode;

a global positioning sensor, said global positioning sensor operably coupled to said controller, said global positioning sensor operable to provide latitude and longitude data of the first vehicle to said controller, said global positioning sensor further operable to provide current speed data of the first vehicle to said controller; and wherein in the second mode, the safety system has detected a second vehicle that has a constant bearing that is calculated to result in a probable collision with the first vehicle such that said controller transmits a signal to said brake actuator to switch said brake actuator to said second mode or said controller transmits a signal to said warning light so as to place said warning light in said second mode.

9. The safety system as recited in claim 8 wherein said warning light is placed in said second mode subsequent detection of a second vehicle being located rearward of the first vehicle and wherein the distance intermediate the vehicle and the second vehicle increases the probability of the first vehicle and the second vehicle colliding.

10. The safety system as recited in claim 9, wherein in said second mode said warning light produces a flashing illumination sequence so as to provide visual notification to the second vehicle of being too proximate the first vehicle.

11. The safety system as recited in claim 10, wherein in said braking actuator is placed in said second mode subsequent the detection of a second vehicle wherein said second vehicle is generally forward of the first vehicle.

12. The safety system as recited in claim 11, wherein said brake actuator further includes a piston chamber, said piston chamber further including a rod, said rod having a first end and a second end, said second end of said rod including a retention mechanism, said retention mechanism operable to be releasably secured to the brake pedal of the braking system of the first vehicle and apply pressure thereto in said second mode said brake actuator.

13. The safety system as recited in claim 12, and further including a monitor, said monitor disposed within the passenger compartment of the vehicle, said monitor operable to display location of the second vehicle.

* * * * *

UNITED STATES PATENT AND TRADEMARK OFFICE
CERTIFICATE OF CORRECTION

| | | |
|---|---|---|
| PATENT NO. | : 8,190,345 B1 | Page 1 of 1 |
| APPLICATION NO. | : 13/220416 | |
| DATED | : May 29, 2012 | |
| INVENTOR(S) | : Panzarella | |

It is certified that error appears in the above-identified patent and that said Letters Patent is hereby corrected as shown below:

Title Page, Item (76) currently reads "Inventor: Robert Panzarella" - Inventor Name should read: "Richard Panzarella".

Signed and Sealed this
Twenty-fourth Day of July, 2012

David J. Kappos
*Director of the United States Patent and Trademark Office*